United States Patent Office 3,323,877
Patented June 6, 1967

3,323,877
PROCESS FOR MAKING BORON COMPOUNDS
James E. Coleman, Edison Township, Middlesex County, N.J., and Frank C. Gunderloy, Jr., Canoga Park, Calif., assignors to Esso Research and Engineering Company, a corporation of Delaware
No Drawing. Filed Mar. 13, 1962, Ser. No. 180,932
12 Claims. (Cl. 23—358)

This invention is concerned with a novel method for preparing hydrazine dihydroboron salts of the type of composition $N_2H_4BH_2An$, wherein An represents an anion such as $NO_3$, $ClO_4$, Cl, Br and the like. Also, this invention is concerned with providing new and useful compounds of this type. Compounds of the type described are useful as chemical intermediates, as reducing agents, and as high-energy gas generating ingredients such as are valuable in solid rocket propellants.

The method for preparing the hydrazine dihydroboron salts may be carried out with certain variations which include: (a) the reaction of diborane, $B_2H_6$, with the hydrazinium (1+) salt containing the anion; and (b) the reaction of hydrazine bis-borane, $N_2H_4 \cdot 2BH_3$, with the hydrazinium (2+) salt containing the anion. These reactions are represented by the following equations:

(a) $x/2 B_2H_6 + xN_2H_4 \cdot HAn \rightarrow (N_2H_4BH_2An)_x + xH_2$ (b) $xN_2H_4 \cdot 2BH_3 + xN_2H_4 \cdot 2HAn \rightarrow$
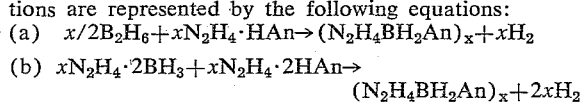
$(N_2H_4BH_2An)_x + 2xH_2$ In these reactions, the resulting product molecules tend to polymerize or associate to form a solid having a varying "$x$" number of molecules thus combined. It is to be noted that in these reactions the hydrazinium salt reactant is a compound in which hydrazine is combined with an acid, preferably a mineral acid such as nitric acid, perchloric acid, or hydrogen halide acid.

In some of the literature, the formulas of these salts are written as $N_2H_4 \cdot HAn$ and $N_2H_4 \cdot 2HAn$, using the name hydrazine monohydrochloride for the "monobasic" salt $N_2H_4 \cdot HCl$, and the name hydrazine dihydrochloride for the "dibasic" salt $N_2H_4 \cdot 2HCl$.

These salts of hydrazine in recent literature are considered as containing the hydrazinium (1+) ion ($N_2H_5^+$) or the hydrazinium (2+) ion ($N_2H_6^{++}$) ionically bonded to the negative ion or anion symbolized by An. A wide variety of salts can thus be obtained of hydrazine, and these include hydrazinium salts of nitric acid, hydrochloric acid, hydrobromic acid, perchloric acid, sulfuric acid, phosphoric acid, and even salts of organic carboxylic acids.

The hydrazinium salts of the relatively strong inorganic acids are preferred for the present purposes.

For better contact and to facilitate handling, the solid hydrazine salt reactants may be slurried in an inert liquid diluent, such as an alkyl ether, or an inert hydrocarbon liquid, e.g. $C_5$–$C_{10}$ hydrocarbons such as paraffin, cycloparaffin and aromatic hydrocarbons, and polyhalogenated hydrocarbons such as carbon tetrachloride.

The amount of inert liquid diluent used is not critical since it serves only as a reaction medium.

The reaction conditions employed, i.e. temperatures and pressures, are governed by convenience and economics of the process. Ambient temperatures in the range of 20° to 30° C. and atmospheric pressure are suitable. While the reaction temperature may be increased to reduce reaction time, a moderate temperature is used to avoid undesired decomposition and degradation of the reactants in the desired product. Under moderate conditions, the reaction is generally carried out for a period ranging from several hours to several days, depending on contacting of the reactants and the particular reactivity of the reactants. The reaction commences almost immediately upon contacting the reactants as evidenced by evolution of hydrogen. The hydrogen may be recovered for use in chemical processes.

The atmosphere in the reaction zone must be inert, especially anhydrous or free from moisture, to avoid degradation of reactants and product. Inert gases, such as nitrogen, helium and argon, may be employed in the reaction zone to protect against entry of air or moisture. Similarly, the inert liquid diluent and the reactants that are supplied to the reaction zone are kept free of moisture.

The following examples illustrate the preferred modes of preparing the hydrazine dihydroboron salts.

Example 1

In a grease-free vacuum apparatus consisting of a large flask, a monometer, a reactor consisting of a small flask attached by means of a ground joint equipped with a rubber O-ring and a mercury cup, a magnetic stirring bar ("Teflon" coated) and a mercury float valve communicating to a general vacuum system, the following were mixed and reacted: 0.45 g. of hydrazinium nitrate ($N_2H_5NO_3$) slurried in 5 cc. n-butyl ether (previously dried over $LiAlH_4$ and distilled into the reactor) and 64.6 standard gas cc. of diborane (1.22 Theory). The mixture was reacted for seven days, during which a pressure rise was noted. Then the volatile material was distilled from the reactor and the reactor filled with dry nitrogen and transferred to a dry box. The product was then slurried in 10 cc. of ethyl ether, filtered and washed with several 10 cc. portions of ether. The product was vacuum dried at 54° C. to remove traces of mercury. The yield was near 0.5 g. (100%) and the product gave the following analysis:

*Analysis.*—Found: percent N, 39.31; percent B, 10.4; percent H, 5.69; percent N of $NO_3$, 12.3; percent active H, 2.1. Theory: percent N, 39.36; percent B, 10.04; percent H, 5.66; percent N of $NO_3$, 13.12; percent active H, 1.89.

The infrared spectrum of this product shows a sharp doublet in the region of 3.8 to 4.2 microns, which is characteristic of the B–H stretching frequencies of the hydrazine dihydroboron cation compounds. In contrast, known hydrazine-borane type compounds, $N_2H_4BH_3$, $N_2H_4 \cdot 2BH_3$ and $[N_2H_2(BH_2)_2]_x$, show B–H stretching bonds in the region of 4.0 to 5.0 microns, and these bands are rather broad bands of uncertain multiplicity.

Example 2

By the method given in Example 1, 0.45 g. of $N_2H_5NO_3$ in 5 cc. of dried n-butyl ether was reacted with 63.1 standard gas cc. of diborane for four days. The ether insoluble product was similarly isolated, giving a yield of 0.485 g. (97%). After vacuum drying at 54° C., analysis showed 13.53% N as $NO_3$, Theory 13.12. The infrared spectrum was identical to that for the product in Example 1.

Example 3

In a 100 cc. pyrex flask equipped with a standard taper joint, 0.07 g. of hydrazine bis-borane and 0.18 g. of hydrazinium dinitrate, $N_2H_6(NO_3)_2$, were milled under a nitrogen atmosphere for three days at room temperature by addition of glass beads and attachment to a rotating evaporator connected to a nitrogen bubbler. The product was washed with ethyl ether and vacuum dried. The yield was 0.19 g. (76% low because of handling losses). Infrared spectrum of the product showed that it was $(N_2H_4BH_2NO_3)_x$ contaminated by a small amount of hydrazinium nitrate.

Example 4

By the method given in Example 3, 0.14 g. of hydrazine bis-borane (onefold excess) and 0.18 g. of hydrazinium dinitrate were milled for three days at room temperature. The ether insoluble product was isolated and vacuum dried. The yield was 0.25 g. (100% based on the hydrazinium dinitrate). Infrared spectrum showed it was $(N_2H_4BH_2NO_3)_x$. X-ray analysis showed no hydrazinium nitrite to be present. In this case, the excess hydrazine bis-borane was separated from the product by solution in the ether.

Hydrazine dihydroboron nitrate $(N_2H_4BH_2NO_3)_x$ is a white to light gray crystalline powder which has a distinct X-ray diffraction pattern. It decomposes on a heated block in the open air at 180° to 190° C. It burns readily in the open air to give a white expanded product. Its impact sensitivity is 8 inches for a 1 kg. weight (No Fires). The autoignition temperature for a 5 sec. ignition is 194° C. The differential thermal analysis shows an exotherm at 180° C. It has a density of 1.27 to 1.40 g./cc. It is decomposed in water, alcohols and the like with evolution of hydrogen. Hydrolysis in 20% nitric acid yield hydrazinium dinitrate and boric acid. This shows that the N—N linkage is intact and coupled with the elemental and active hydrogen analysis gives the general formula $N_2H_4BH_2NO_3$. Considering that it is insoluble in many organic solvents and that it exhibits the sharp doublet in the infrared B–H stretching region, the structure is probably II rather than I. Compounds of the type $$(CH_3)_3NBH_2Cl$$

are known to be covalent and readily soluble in organic solvents.

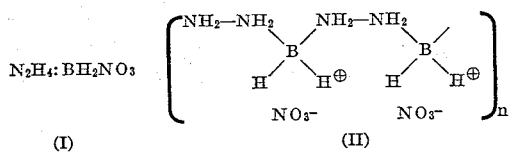

In the Formula II, the subscript "$n$" indicates that the unit is recurring. The composition is $(N_2H_4BH_2NO_3)$ with respect to atomic ratio of the constituents.

Example 5

By the method given in Example 1, the following were mixed and reacted: 0.43 g. of hydrazine monohydrochloride or hydrazinium chloride, $N_2H_5Cl$, 5 cc. n-butyl ether (dried over $LiAlH_4$) and 350 cc. (S.T.P.) of diborane. Stirring was effected by means of a magnetic stirrer. The mixture was allowed to react for nine days, during which a rise in pressure was noted. The reactor was then opened to the vacuum system and all volatile components were removed. The reactor was transferred into a dry box and the contents washed with three 10 cc. portions of ethyl ether. These washings were filtered and the ether insoluble product was vacuum dried. The yield was 0.40 g. (80%) of a white powder. Infrared spectrum of the product was very distinctive and showed no indication of $N_2H_5Cl$. Analysis gave the following results: 33.31% N, 12.3% B, 42.0% Cl, 6.99% H, and 1.86% active H. Theory for $(N_2H_4BH_2Cl)$ is 34.88% N, 13.47% B, 44.12% Cl, 7.53% H, and 2.52% active H.

The product was insensitive to impact, showing no indication of firing under the impact of a 2 kg. weight dropped 35 inches. At 250° C., the material neither melted nor burned.

A sample of the product was reacted with $NaBH_4$ in tetrahydrofuran and yielded hydrazine bis-borane.

In view of the insolubility of the product in many organic solvents, and its high melting point and stability, the structure of the product should be II rather than I.

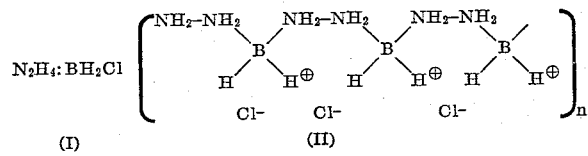

Example 6

Similar to the method given in Example 3, 0.39 g. of hydrazinium dibromide, $N_2H_6Br_2$, and 0.12 g. of hydrazine bis-borane were milled under vacuum at room temperature for eight days. The ether insoluble product was isolated and vacuum dried. The yield was 0.48 g. (96%). The infrared spectrum has a doublet in the 3.8 to 4.2 micron region showing that $(N_2H_4BH_2Br)_x$ has been prepared.

Example 7

Similar to the method of Example 1, 0.33 g. of hydrazinium perchlorate, $N_2H_5ClO_4$, was reacted with 44.1 standard gas cc. of diborane in 5 cc. of dry n-butyl ether. After reacting for seven days, the volatiles were removed, the product washed with ether and vacuum dried. Infrared spectrum of the product showed the doublet in the 3.8 to 4.2 region. Thus the product was a mixture of $(N_2H_4BH_2ClO_4)_x$ and $N_2H_5ClO_4$.

The hydrazine dihydroboron nitrate and perchlorate salts are considered to be of particular value as high-energy compounds which can supply oxygen for oxidizing while they undergo combustion to form hydrogen and boron nitride, BN. These compounds have an oxygen-containing anion and have been estimated to have a specific impulse in the range of 275 to 280 when used as a replacement for hydrazine nitroformate in standard formulations.

Other uses that can be made of this new type of compounds which are salts of hydrazine dihydroboron are as reducing agents and chemical intermediates. These salts release active hydrogen on reaction with water or alcohols. The various salts can also be used for anion exchange reactions.

It is not intended to restrict the present invention to the foregoing examples because modifications will be apparent to those skilled in the art.

What is claimed is:
1. Hydrazine dihydroboron salt having the composition $(N_2H_4BH_2An)$, wherein An represents the anion of an acid which combines with hydrazine to form a hydrazinium salt.
2. Hydrazine dihydroboron salt having the composition $(N_2H_4BH_2An)$, wherein An represents the anion of an acid which combines with hydrazine to form a hydrazinium salt of an acid selected from the group consisting of nitric acid, hydrochloric acid, hydrobromic acid and perchloric acid.
3. The hydrazine dihydroboron salt of nitric acid having the composition $(N_2H_4BH_2NO_3)$.
4. Hydrazine dihydrocarbon chloride having the composition $(N_2H_4BH_2Cl)$.
5. Hydrazine dihydroboron bromine having the composition $(N_2H_4BH_2Br)$.
6. Hydrazine dihydroboron perchlorate having the composition $(N_2H_4BH_2ClO_4)$.
7. Method for preparing a hydrazine dihydroboron salt which comprises, reacting diborane with a hydrazinium (1+) salt with evolution of hydrogen, and recovering as a solid product the resulting hydrazine dihydroboron salt containing the anion of the hydrazinium salt.
8. Method for preparing hydrazine dihydroboron salt which comprises, milling a mixture of solid hydrazine bis-borane with a hydrazinium (2+) salt in an inert gaseous atmosphere with evolution of hydrogen, and recovering as solid product hydrazine dihydroboron salt containing the anion present in the hydrazinium salt.
9. Method for preparing a hydrazine dihydroboron salt having the composition $(N_2H_4BH_2An)$, which comprises reacting diborane with a hydrazinium salt of an acid selected from the group consisting of nitric acid, hydrochloric acid, hydrobromic acid and perchloric acid, and recovering the resulting hydrazine dihydroboron salt containing an anion An of the hydrazinium salt reactant.

10. The method for preparing a hydrazine dihydroboron salt which comprises, reacting diborane with a hydrazinium (1+) salt of an acid from the group consisting of nitric acid, hydrochloric acid, hydrobromic acid and perchloric acid, and recovering as a solid product the resulting hydrazine dihydroboron salt containing the anion of the hydrazinium salt.

11. The method as described in claim 10 wherein the hydrazinium salt is slurried in n-butyl ether as an inert diluent for reaction with gaseous diborane dissolved in the diluent.

12. Method for preparing hydrazine dihydroboron salt which comprises, milling and reacting a mixture of solid hydrazine bis-borane with a hydrazinium (2+) salt selected from the group consisting of hydrazinium dinitrate, hydrazinium dichloride, hydrazinium dibromide and hydrazinium diperchlorate in an inert atmosphere with hydrogen, and recovering as solid product hydrazine dihydroboron salt containing an anion of the hydrazinium salt reactant.

References Cited

Goubeau et al.: "Zeitschrift fur Anorganische und Allgemeine Chemie, volume 310, pages 135–138 (1961).

OSCAR R. VERTIZ, *Primary Examiner.*

LEON D. ROSDOL, *Examiner.*

L. A. SEBASTIAN, M. WEISSMAN,
                        *Assistant Examiners.*